(12) United States Patent
Adkins et al.

(10) Patent No.: US 7,464,114 B2
(45) Date of Patent: Dec. 9, 2008

(54) METHOD AND APPARATUS TO CAPTURE AND TRANSMIT DENSE DIAGNOSTIC DATA OF A FILE SYSTEM

(75) Inventors: Janet Elizabeth Adkins, Austin, TX (US); Mark Allen Grubbs, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 11/236,450

(22) Filed: Sep. 27, 2005

(65) Prior Publication Data

US 2007/0073781 A1    Mar. 29, 2007

(51) Int. Cl.
*G06F 17/30* (2006.01)
*G06F 12/00* (2006.01)

(52) U.S. Cl. .................. 707/200; 707/202; 707/204
(58) Field of Classification Search ......... 707/200–202, 707/204–205; 714/21; 711/162; 370/254
See application file for complete search history.

(56) References Cited

U.S. PATENT DOCUMENTS

| | | | | |
|---|---|---|---|---|
| 6,564,228 B1 * | 5/2003 | O'Connor | .................. | 707/200 |
| 6,584,582 B1 * | 6/2003 | O'Connor | .................. | 714/21 |
| 6,804,719 B1 * | 10/2004 | Cabrera et al. | .............. | 709/226 |
| 6,829,688 B2 * | 12/2004 | Grubbs et al. | ............... | 711/162 |
| 7,085,785 B2 * | 8/2006 | Sawdon et al. | ............... | 707/204 |
| 7,340,492 B2 * | 3/2008 | Cabrera et al. | .............. | 707/205 |
| 2002/0196744 A1 * | 12/2002 | O'Connor | .................. | 370/254 |

OTHER PUBLICATIONS

Moshe Bar, "the JFS Journaling File system", Published Oct. 2000.*
Steve Best, "Journaled File System (JFS) for Linux", O'Reilly Open Source Convention, San Diego, Jul. 25, 2002.*
Vijayan Prabhakaran et al., "Analysis and Evolution of Journaling file system", computer Sciences Department University of Wisconsin, Madison.*
U.S. Appl. No. 10/777,719, filed Feb. 12, 2004, Adkins et al.
U.S. Appl. No. 10/682,399, filed Oct. 9, 2003, Chang et al.
"Method for extended NFS file system attributes to a volume manager", IBM Research Disclosure, 449167, Sep. 2001, pp. 1615.
"Zero Contents Snapshot", May 2002, pp. 1-4. http://priorart.ip.com/viewPub.isp?style=dtFreeTextSearch&scache=31703750&snum=0 &kwHighlight retrieved Aug. 15, 2005.

* cited by examiner

*Primary Examiner*—Hung T Vy
(74) *Attorney, Agent, or Firm*—Duke W. Yee; Matthew W. Baca; LaRhonde Jefferson-Mills

(57) ABSTRACT

A processor selects file system metadata. A processor identifies each unit of data in a file system. The processor determines if the unit of data contains file system metadata. The processor writes a unit of data of metadata to a diagnostic file system, provided it was determined that the unit of data contains file system metadata. The processor then determines if the unit of data contains user data. If the unit of data contains user data, the processor writes a sparse object to the diagnostic file.

1 Claim, 4 Drawing Sheets

```
        701    703     705     707          709
          \   ┌─┴─┐  ┌──┴──┐ ┌──┴──┐ ┌────────┴────────────┐
$>crfs  -v  jfs2  -g  rootvg  -m  /newfs  -a size=<new filesystem size>
                                          └──────────┬──────────────┘
                                                    711

721
       \
$>mount /newfs 722              725                    735
     \         ┌─────┴──────┐      ┌────────┴────────┐
$>fsck -n  -o  metacapture=/newfs/out1  <file system mount point>
         /
       723

741              743
                ┌──────┴──────┐      ┌──┴──┐
$>backup  -f  <destination filename>  -0  /newfs
            /
          739

$>compress  <destination filename>
          /
        751
```

*FIG. 7*

METHOD AND APPARATUS TO CAPTURE AND TRANSMIT DENSE DIAGNOSTIC DATA OF A FILE SYSTEM

BACKGROUND OF THE INVENTION

1. Field of the Invention

The present invention relates generally to maintaining and improving file system integrity. More specifically, the present invention relates to a method, apparatus, and computer usable code to obtain file system metadata in a dense format so that such data may be transmitted off-site for expert review and remedies.

2. Description of the Related Art

In computing, a file system is a structure for storing and organizing computer files and the data they contain to make it easy to find and access the files. File systems may use a storage device such as a hard disk or CD-ROM and involve maintaining the physical location of the files. Alternatively, a file system may be a virtual file system. A virtual file system exists only as an access method for virtual data or for data over a network.

File systems are made of two types of data. The first type of data, which usually predominates, is user data. The content type of user data may be, for example, text, graphics, music, and computer instructions. The second type of data is file system metadata. File system metadata is all the data that is not the user data. Metadata informs a processing system of the statistics and structure of the files containing user data.

File system metadata includes a superblock, which provides a file system summary and includes pointers to other information. An inode is file system metadata that is associated with each file. The inode denotes the length of the file in bytes, an associated device identifier, a user identifier, a group identifier, an inode number that may be unique, the file mode, a timestamp, and a reference count.

A block is the smallest unit of disk storage that may be allocated to a file. For example, a processor may establish a block to be 1024 bytes on a particular file system. This means that a file will nearly always fill one or more blocks, with the final block being only part occupied by data.

Parts of a file may reside in numerous blocks, sometimes scattered about a disk drive. An inode may have several blocks listed within the inode. For larger files, an inode may include an indirect block, which may point to a list of additional blocks. Often this leads to a tree-like structure of multiple levels of indirect blocks pointing to successively deeper tiers of blocks.

File systems tend to be very large data structures. When a processor makes changes to the file system, the processor often requires many separate write operations. Occasionally an error or other fault interrupts the sequence of writes, for example, a power failure may occur.

A race condition may happen when a processor encounters an error in this situation. A race condition is what happens when two events in an electronic device essentially race each other to see which influences the device's state or output, wherein the first event or signal to arrive controls the device's state. In the context of file systems, such as a journaling file system, two steps occur when updating the file system: 1) removing a file's directory entry; and 2) marking the file's inode as free space in a free space map.

If power fails, and step 1 happens immediately prior to the crash, an orphaned inode will be present, and more of the blocks will appear to be allocated to storage than is actually allocated. If step 2 happens immediately prior to the crash, the not-yet-deleted inode will be marked free and possibly be overwritten by something else.

Journaling file systems, a particular type of file system, have additional failure modes. In addition to the two steps noted above, a journaling file system has a third step of committing changes made for the transaction. When things function correctly, a processor either commits all of a transaction, or commits none of the transaction to a journal log. In a journaling file system, the processor may replay the journal log to establish the metadata in a consistent state. However, a journaling file system can become inconsistent when I/O error handling fails, such as occurs when a write fails, but the processor writes other parts of the transaction to the journal log.

A hazard involved with remotely outsourcing maintenance and recovery of file systems is that transmitted details of the file system may be intercepted. This is especially true where data is transmitted via the internet. Even encrypted data, once intercepted, may be subject to compromise. Consequently, there is a long standing desire to avoid transmitting sensitive information over the internet where possible.

SUMMARY OF THE INVENTION

The aspects of the present invention provide a computer implemented method for generating file system metadata. A processor identifies each unit of data in a file system. The processor determines if the unit of data contains file system metadata. The processor writes a unit of data of metadata to a diagnostic file, provided it was determined that the unit of data contains file system metadata. The processor then determines if the unit of data contains user data. If the unit of data contains user data, the processor writes a sparse object to the diagnostic file.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment of the present invention when read in conjunction with the accompanying drawings, wherein:

FIG. 7 shows an example of commands entered at a command line of an AIX operating system in accordance with an illustrative embodiment of the present invention.

DETAILED DESCRIPTION OF THE PREFERRED EMBODIMENT

Figure 1:
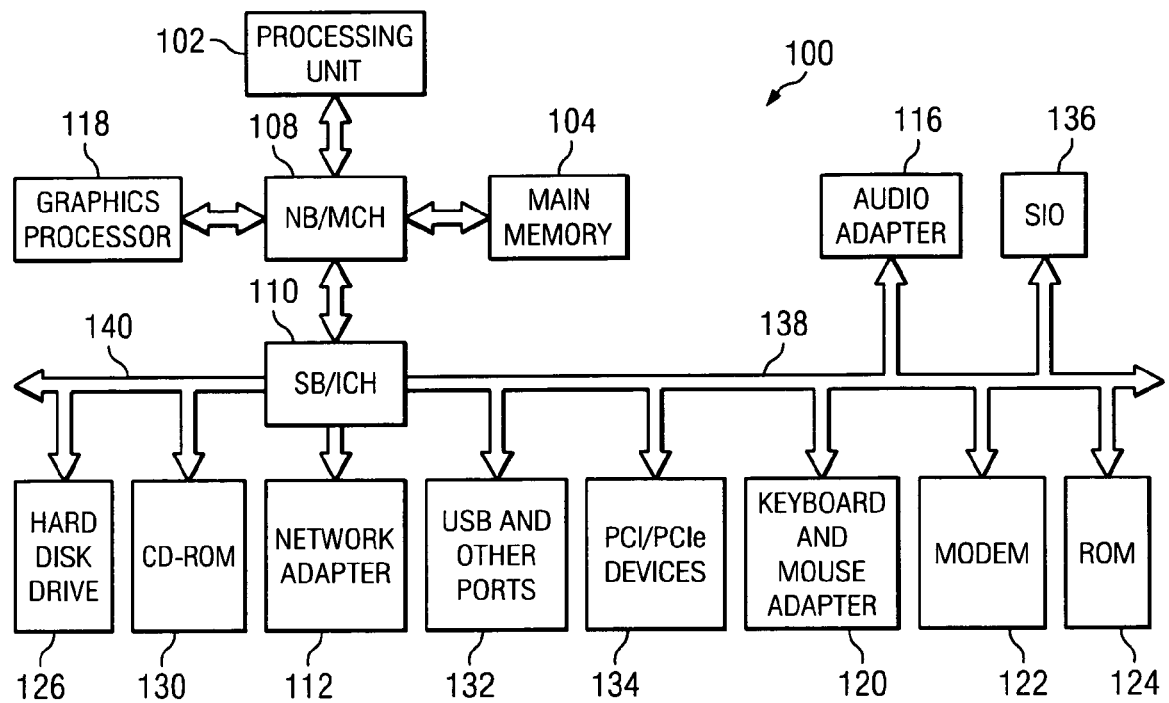
FIG. 1 shows a block diagram of a data processing system in which embodiments of the present invention may be implemented.

With reference now to the figures and in particular with reference to FIG. 1, a block diagram of a data processing system is shown in which embodiments of the present invention may be implemented. In the depicted example, data processing system 100 employs a hub architecture including north bridge and memory controller hub (MCH) 108 and south bridge and input/output (I/O) controller hub (ICH) 110. Processing unit 102, main memory 104, and graphics processor 118 connect to north bridge and memory controller hub 108. Graphics processor 118 may connect to north bridge and memory controller hub 108 through an accelerated graphics port (AGP) or graphics processor 118.

In the depicted example, local area network (LAN) adapter 112, audio adapter 116, keyboard and mouse adapter 120, modem 122, read only memory (ROM) 124, universal serial bus (USB) ports and other communications ports 132, and PCI/PCIe devices 134 connect to south bridge and I/O controller hub 110 through bus 138. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS).

Hard disk drive 126 and CD-ROM drive 130 connect to south bridge and I/O controller hub 110 through bus 140. Hard disk drive 126 and CD-ROM drive 130 may use, for example, an integrated drive electronics (IDE) or serial advanced technology attachment (SATA) interface. Super I/O (SIO) device 136 may be connected to south bridge and I/O controller hub 110.

An operating system runs on processor 102 and coordinates and controls various components within data processing system 100 in FIG. 1. The operating system may be a commercially available operating system, such as Advanced Interactive executive (AIX®), which is available from IBM Corporation. AIX is a registered trademark of IBM Corporation.

The various embodiments of the present invention permit transmitting of just the particulars of file system inconsistency without the bother of transmitting cumbersome user data. The user data tends to comprise the majority of file system data, and thus are not sent, except in a place-keeping form. A file system consistency check program identifies a plurality of units of data in a file system. One way to identify is for the file system consistency check program to identify the file system's tree-like structures moving from one unit of data to another unit of data. Some embodiments may use units of data as small as blocks. Other embodiments may use larger units of data, for example, sectors. If a unit of data contains file system metadata or metadata, then the software writes or copies the unit of metadata to a diagnostic file, which may be a part of a diagnostic file system. If a unit of data contains user data, then the software writes or copies a sparse object to a diagnostic file. Later, steps to backup or otherwise consolidate the diagnostic file treat the sparse objects as a compact version of the original user data, but entirely vacant and unwritten. A sparse object may be a null pointer in a file's metadata. Since the pointer points to no reference, there is no underlying data stored—merely the representation of an empty or all '0's unit of data. Thus, such sparse objects operate in a sense as place-keepers, substituting for a tract of '0's in a unit of data on the disk or other media comprising the file system. Consequently, a processing system may transmit each sparse object in a vastly reduced form as compared to the source file system.

Figure 2:
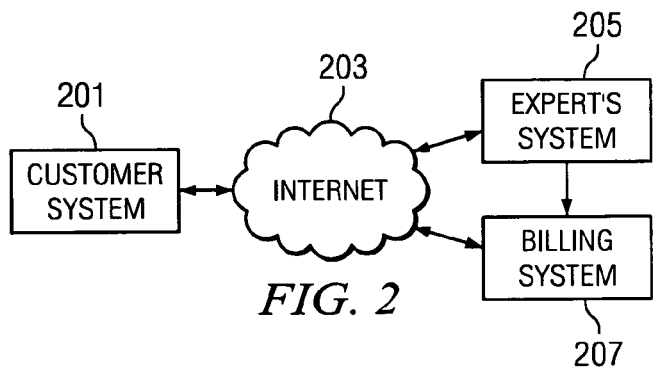
FIG. 2 shows how a customer system may interact with an expert's system in accordance with an illustrative embodiment of the present invention.

FIG. 2 shows how customer system 201 may interact with expert's system 205 in accordance with an illustrative embodiment of the present invention. Customer system 201 may operate using, for example, processing system 100 of FIG. 1. An administrator may determine that a file system is behaving anomalously. In response, an administrator may operate customer system 201 to generate a dense diagnostic file containing dense diagnostic data.

Expert's system 205 may receive a diagnostic file system from customer system 201. Expert's system 205 services the diagnostic file system to form a serviced file system. Expert's system 205 may operate using, for example, processing system 100 of FIG. 1. Servicing may include, for example, performing maintenance on the diagnostic file system to form the serviced file system. In addition, servicing may include performing recovery actions on the diagnostic file system. Billing system 207 may monitor activity on the diagnostic file system. Billing system 207 may monitor activity on expert's system 205 so that billing system 207 may bill the customer for services provided in servicing the diagnostic file system. Expert system 205 returns the serviced file system to customer system 201.

A dense file format is the outcome that occurs when a sparse file is compressed. The administrator may enter commands at a command line editor to, among other things, perform a file consistency check that reduces the user data as will be described below. Since a processor may reduce the user data to the point of hiding even the type of content stored therein, the resultant file or files are dense with metadata that concerns, more directly, the source of file system errors. Thus, the term dense diagnostic data is applied to describe the compacted file or files that result from the various illustrative embodiments of the present invention. In other words, dense diagnostic data is created following discarding user data or using place-keepers instead of user data, then compressing the resultant file or files.

Customer system 201 transmits the dense diagnostic data via a network, for example, Internet 203. The dense diagnostic data arrives at expert's system 205. Expert's system 205 may be under the control of a data recovery specialist. The data recovery specialist may not have an established trust relationship with the administrator. In addition, Internet 203 is known to be an insecure means of transmitting data.

Figure 3:
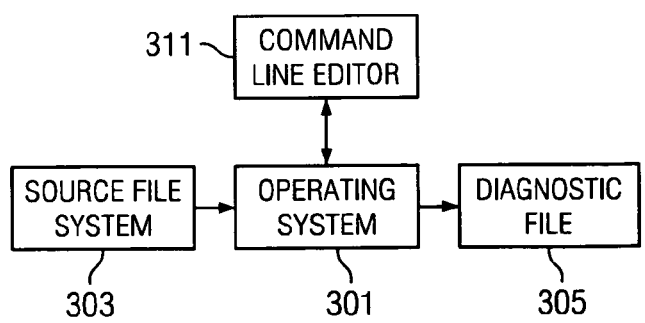
FIG. 3 shows the operation of an operating system to mediate the transformation of a source file system to a diagnostic file in accordance with an illustrative embodiment of the present invention.

FIG. 3 shows the operation of an operating system to mediate the transformation of a source file system to a diagnostic file in accordance with an illustrative embodiment of the present invention. Operating system 301 may run on processor, for example, processor 102 of FIG. 1. Source file system 303 may be stored on, for example, hard disk drive 126 of FIG. 1. An administrator may use command line editor 311 to enter commands individually to operating system 301. One or more of the commands may generate diagnostic file 305. In addition, a utility program may be used in place of the command line editor 311 wherein the utility program writes commands to the operating system.

Figures 4A, 4B:
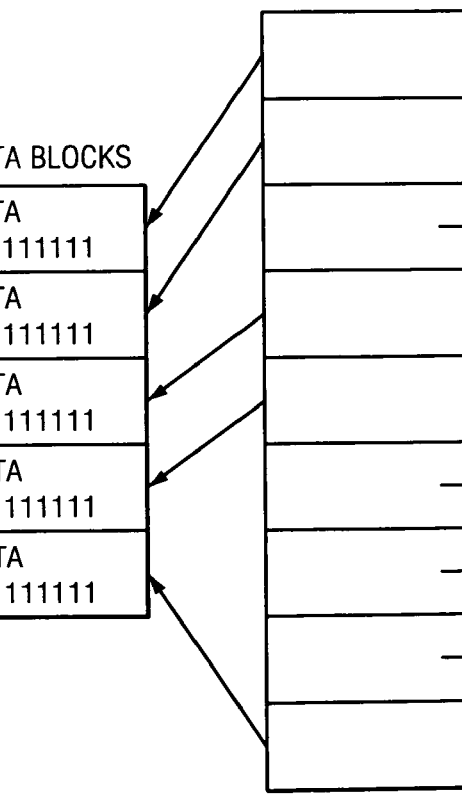
FIG. 4A shows an example of a traditional file format in accordance with an illustrative embodiment of the present invention.
FIG. 4B shows an example of the sparse file format in accordance with an illustrative embodiment of the present invention.

FIG. 4A shows an example of a traditional file format. Each bit that is allocated to file 411 is set to '0' even if a file pointer passes over the physical disk address using a seek command, for example, '0' block 413. In this format, a processor physically writes all allocated bits and blocks of a file, and no compression is employed at the physical level.

FIG. 4B shows an example of the sparse file format, sometimes called a sparse object, which may be associated with a diagnostic file. This format involves a processor performing a logical write of each bit, but in practice, the processor physically stores data only where the file pointer indicates. A file pointer is a location where a next physical write is to occur. Where a processor permits gaps to exist between file writes, a notation is made in metadata, for example, block pointer table 414. The processor makes a notation to block pointer table 414 by establishing null pointers 415, 416, 417, and 418 where a block of '0's is logically recorded. In other words, each null pointer operates as a kind of place holder for the block of '0's that would otherwise by physically written to the hard drive. The format is sparse because large tracts of '0's may be retrieved on subsequent reads. Moreover, file metadata is the place where references to each '0' block is kept, rather than storing tracts of '0's in the user-data. Tracts of '0's, or '0' blocks are represented by the sparse object, and some file systems may read from the sparse object a large tract of '0's during the ordinary operation of the operating system, for example, when a program calls upon the operating system to read.

A dense file format is the outcome that occurs when a sparse file is compressed. A processor may compress each '0' block significantly. Data comprised of somewhat random sequences of '1's and '0's are compressed as well, though, perhaps not as much. Thus, the '0' blocks are compressed together with the somewhat random data such that all of a file is physically written in compressed form. A file or files that originate as diagnostic data may become dense diagnostic data once the compression is complete.

Figure 5A:
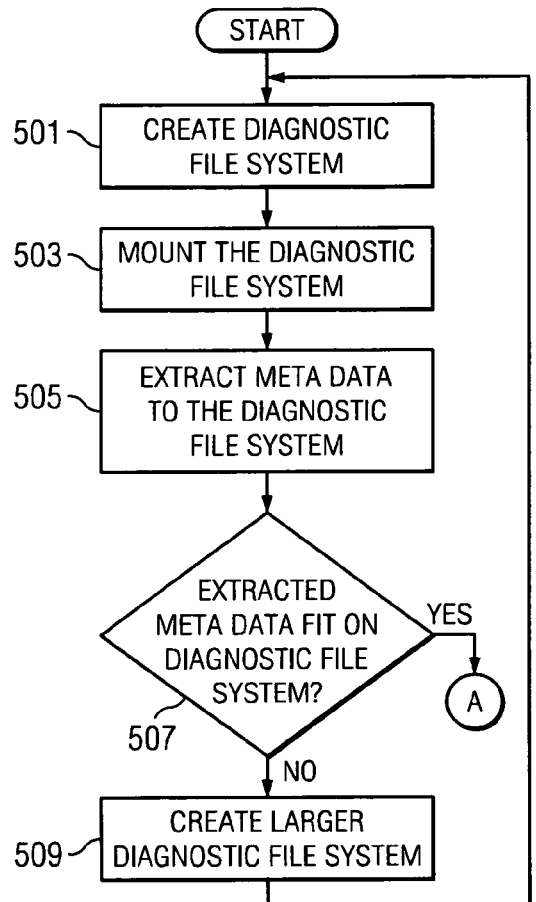
FIG. 5A shows the initial steps to obtaining diagnostic data concerning a file system in accordance with an illustrative embodiment of the present invention.

FIG. 5A shows the initial steps to obtaining diagnostic data concerning a file system in accordance with an illustrative embodiment of the present invention. An administrator may instruct a processor to perform these steps by entering command lines to command the operating system to perform each step. Equally suitable would be to consolidate all steps into a script of commands that run automatically in sequence. The operating system may be operating system 301 of FIG. 3, for example. A processor receives a command to create a diagnostic file system (step 501). The diagnostic file system may be associated with diagnostic file 305 of FIG. 3. In Unix-like systems, a command may be necessary to make the newly created file system accessible to the operating system. In the present illustrative embodiment, that command is 'mount'. The processor receives a mount command to mount the diagnostic file system (step 503). The diagnostic file system is now ready for collecting data. The processor receives a command to extract metadata to the diagnostic file (step 505). The command may be, for example, the file system consistency check, fsck. The diagnostic file may include sparse objects. The diagnostic file may be associated with the diagnostic file system by being a component of the diagnostic file system.

Fsck generates a lot of data, which may potentially overwhelm the storage allocated when the processor created the diagnostic file system. Thus, the processor tests to see if extracted metadata fits on diagnostic file system (step 507). If processor makes a determination of no, then the processor may receive a command to create a larger diagnostic file system (step 509). Processing may follow from step 509 with a mount of the diagnostic file system and other steps.

Figure 5B:
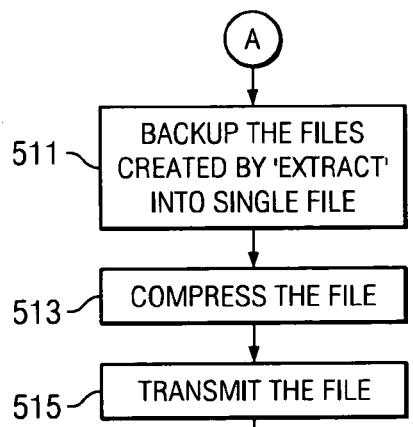
FIG. 5B shows the steps to package and transmit diagnostic data concerning a file system in accordance with an illustrative embodiment of the present invention.

If a processor makes a determination that the extracted metadata fits on the diagnostic file system, processing continues through connector 'A' to FIG. 5B.

Alternatives to creating a file system and mounting the file system exist. For example, a dedicated file system may exist for the purpose of recording diagnostic data, and may be deleted prior to the operation of writing dense diagnostic data to the dedicated file system.

One way for a data processing system to recover is to perform a complete walk or traverse over the file system's data structures when the processor next mounts the file system. A traverse, as well as other steps, may detect and correct any inconsistencies. One tool used to execute this remedy is the file consistency check or the fsck command. Other file consistency check programs include the Microsoft 'chkdsk', also known as 'check disk', program. Computer administrators use fsck in computers that employ operating systems that have file systems. Such operating systems include, for example, AIX, and Linux, which are similar in operation to UNIX. Linux is a registered trademark of Linus Torvalds. UNIX is a registered trademark of The Open Group. Other operating system classes include the various generations of Windows™ operating systems by Microsoft™ Corporation, and MacOS by Apple™ Corporation. Examples of file systems include journaling file systems such as IBM's Enhanced journaling file system or JFS2.

File systems on Unix-like operating systems offer a convenient way to store redundant data that behaves in some respects as if storage is allocated for the redundant data. The way includes creating a sparse object of at least a block in size. When a processing system first opens a file, the processor may create a file pointer to point to the beginning of the file. The file pointer operates as a place-keeper to denote where a processor should next write data, wherein the processor treats the file as being linear. In other words, the next time the processor executes a command to write, the processor will write at the place where the file pointer is. If the processor advances the file pointer without a write command, then there is space reserved for the file by the file system, but no corresponding allocation of a block to the file. Rather, the file system metadata stores in a few bytes the existence of an extended empty head to the file, but the processor does not mark any data units as used. A data unit may be, for example, a block. If many blocks are noted as used in this way, a great economy of actually used disk space occurs, since a few bytes may represent the many blocks. A common way to move a file pointer forward and other directions is using the lseek system call, commonly available on Unix-like systems. Other file pointer movement commands exist on other systems.

One of the things that a file consistency check looks for is inconsistencies in the data structures. File consistency check software looks for inconsistencies by navigating the data structure for the file system. The data structure for file systems consists of a tree having a root and one or more branches from the root. For example, the directory structure begins at a root, and may have one or more directories underneath the root. Similarly, each file has its constituent parts stored in blocks that also may have multiple branches and tiers, wherein a block is a node at each branching point. A block that includes pointers or references to further blocks, stores such pointers as metadata.

A file consistency check software navigates trees by traversing from data unit to data unit, wherein each data unit may be a block. Traversing means that a file consistency check software examines a block for the presence of additional branches below it, and provided there are some, the software examines each branch in turn, until all branches are exhausted. Examining means many things. Generally, examining means a processor looks for additional references or pointers along additional branches.

In consistent file systems, each data unit has exactly a single reference to the data unit, which means that a processor will traverse a data unit only once. Again, a data unit may be, for example, a block. However, in inconsistent file systems, a block may be referenced multiple times. The software may identify units of a file by traversing. For example, a file consistency check software may traverse a first file and note that a block is allocated to the first file. The software may traverse a second file, and note that the same block is also allocated to the second file. In essence, the file system accidentally has allocated the same block twice, and likely overwritten the first file's data with that of the second file. By traversing through all the files, a file consistency check may discover many problems.

File consistency checks may remedy the problem in response to interaction with a user in a question and answer format. However, this function can be so complex and specialized that an administrator to a file system may call on outsourced assistance from a specialist in order to maximize the recovery of data. Unfortunately, although many specialists are highly qualified, there may not be an established level of trust between the administrator of the file system and the specialist. In other words, there needs to be a mechanism to protect the user data on the file system from being compromised.

A software developer may add code to fsck, and other file consistency checkers. The additional code takes an additional step when traversing the allocated blocks of each file. In addition to noting inconsistencies, fsck may write copies of certain aspects of each file. The process of traversing and writing is performed in step 505 in FIG. 5A above. The copies may potentially overwhelm the storage allocated when the processor created the diagnostic file system.

FIG. 5B shows the steps to package and transmit diagnostic data concerning a file or a file system in accordance with an illustrative embodiment of the present invention. An operating system, such as operating system 301 of FIG. 3 may perform the steps of FIG. 5B. Alternatively, the steps of FIG. 5B may be implemented by a utility program wherein the utility program writes commands to the operating system. In general, the steps of FIG. 5B accomplish the general function of creating a data structure that is smaller and more amenable to transfer over a network or via other means. Initially the operating system backs up or otherwise consolidates the diagnostic file system into a single file (step 511). Operating system may then compress the file (step 513). When an operating system compresses, that means that the processor takes advantage of repetition and redundancy to summarize the data and store the shortened summary. For example, another way to describe a block of 4096 '0's other than showing all 4096 '0's is to simply store electronically 4096×0, which is much shorter. In addition, since a null pointer may already exist in the metadata, simply storing the null pointer operates as compression. Even a large sequence of null pointers may be compressed. For example, another way to describe a sequence of 1000 null pointers, other than physically storing each of the null pointers, is to store electronically 1000× null. Operating system then transmits the compressed file or dense diagnostic data (step 515). Thus, an operating system converts user data to dense diagnostic data. Estimates are that 1024 gigabyte enhanced journaling file system (JFS2) file system with many small files, can be converted to dense diagnostic data of about 160 megabytes—a 6,000-fold compression.

Figure 6:
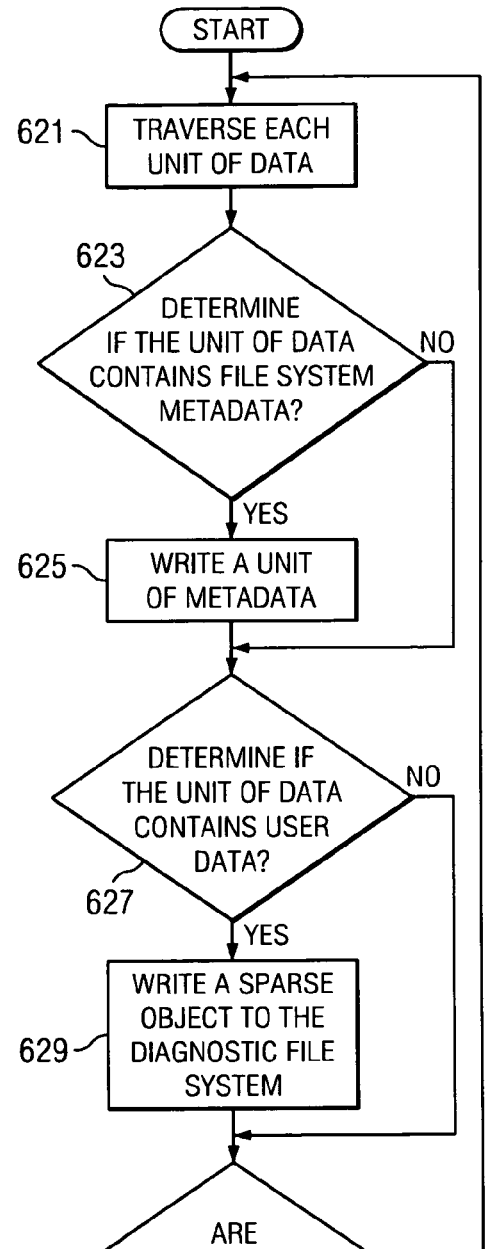
FIG. 6 shows the detailed steps to obtain diagnostic data using an enhanced file consistency check software in accordance with an illustrative embodiment of the present invention.

FIG. 6 shows the detailed steps to obtain diagnostic data using enhanced file consistency check software. The enhanced file consistency check may be a version of fsck. Fsck traverses each unit of data in a file system (step 621). A processor running fsck may determine if the unit of data contains a file system metadata (step 623). By 'contains' is meant that the unit of data comprises at least a portion of all the metadata that makes up the file system. Fsck writes a unit of metadata in response to a determining that the unit of data is file system metadata (step 625). Otherwise, steps 623 and 625, continue to step 627. Fsck determines if the unit of data contains user data (step 627). Fsck writes a sparse object to the diagnostic file in response to a determining that the unit of data is user data (step 629). Writing the sparse object may comprise the processor writing a null pointer in a metadata. The null pointer may be, for example, null 415 of block pointer table 414 of FIG. 4B. Fsck determines if additional units of data remain to be traversed (step 631). Each write of steps 625 and 629 may be to a diagnostic file, wherein the diagnostic file may be associated with a diagnostic file system 305 of FIG. 3. A sparse object differs from a non-sparse object in that writes to a disk do not change data, except to note that a block is empty or is filled with data that is not valid. Rather than occupy an entire block, fsck merely makes a list of all sparse objects associated with the metadata. Alternatively, fsck merely uses the lseek system call to advance a file position of a file that has been opened for writing. Lseek system calls are file handling system calls available on Unix-like operating systems. Essentially the lseek command tells the operating system to move the file position past the current end of file. To the extent that the lseek system call advances the file position across an entire block, the operating system records that a block is a sparse block or a sparse object, without allocating a physical block of storage on the disk drive. A sparse object is a virtual block of storage, but does not occupy the space of a full block of physical storage. Rather a metadata identifies the number of such blocks that are associated with a file, among other things. Nevertheless, a processor adds such sparse objects into the tally when the total space occupied by a file is determined during directory listings.

FIG. 7 shows an example of commands entered at a command line of an AIX operating system in accordance with an illustrative embodiment of the present invention. Text enclosed in angled brackets, < >, indicate a user-specified string. For example <new filesystem size> 711 may be a number that specifies the number of 512 byte blocks to allocate to the new file system.

The first statement uses the crfs command 701 to create a file system. The flags are as follows:

v jfs2 703 specifies the virtual file system type;

g rootvg 505 specifies an existing volume group on which to make the file system. A volume group is a collection of one or more physical volumes;

m/newfs 707 specifies the mount point, which is the directory where the file system will be made available; and a size=<new filesystem size> 709 specifies the size of the JFS2 in 512-byte blocks, wherein, if the specified size is not evenly divisible by the physical partition size, the processor rounds up to the closest number that is evenly divisible.

The diagnostic file system may be diagnostic file system 305 of FIG. 3.

Mount/newfs 721 instructs the processor to mount the file system.

The file consistency check is next, and uses fsck 722 command, which comprises the following flags:

n 723 instructs the processor to execute the file consistency check in non-interactive mode, that is, without querying the user for remedies, and without changing the specified file system;

o metacapture=/newfs/out1 725 identifies a parameter that instructs the processor to write copies of the metadata and sparse objects to a file having sparse objects, wherein the file is located in /newfs/out1 or other user-specified directory;

<file system mount point> 735 is the identity of the file system for the processor to perform diagnostics on.

The processor consolidates based on the remaining two lines. Backup 739 instructs the processor to place all files created in the fsck 722 into a single file. That is, place the diagnostic file system into a single file. Backup 739 includes the following flags:

f<destination filename> 741 identifies one or more devices to store output; and 0/newfs 743 specifies the source file system for the backup.

Compress 751 is a step to replace the sparse objects with compression tokens. The only parameter that compress 751 takes is <destination filename> which is the file where the dense diagnostic data is stored.

It is appreciated that consolidation may also be done by taking the individual files presented by the file consistency check and compressing each file. Each file then becomes dense diagnostic data, and each subsequent file added to the body of files adds to the dense diagnostic data.

Thus, the aspects of the present invention provide a computer implemented method, apparatus, and computer usable program code to obtain the specifics concerning file system inconsistencies in such a way that user data is secure, even from the specialist assigned to fix the file system inconsistencies. In addition, aspects of the present invention may permit a file system developer to diagnose problems in software under development, wherein the software under development may contribute to file system inconsistencies. Furthermore, the sparse objects may be sent to a service team who can extract the sparse objects into a logical volume, or look at the sparse object directly to debug the file system problem.

The invention can take the form of an entirely hardware embodiment, an entirely software embodiment or an embodiment containing both hardware and software elements. In a preferred embodiment, the present invention is implemented in software, which includes, but is not limited to, firmware, resident software, microcode, etc.

Furthermore, the present invention can take the form of a computer program product accessible from a computer-usable or computer-readable medium providing program code for use by, or in connection with, a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The illustrated embodiment of the present invention was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for generating file system metadata comprising:

identifying a plurality of units of data in a file system;

determining if a first unit of data in the plurality of units of data contains file system metadata;

writing the file system metadata from the unit of data to a diagnostic file system, in response to a determining that the first unit of data contains the file system metadata;

determining if the unit of data contains user data;

writing a sparse object to a diagnostic file, in response to a determining that the first unit of data contains the user data, wherein the diagnostic file is associated with the file system metadata;

associating the diagnostic file with the diagnostic file system;

mounting the diagnostic file system, wherein mounting associates the diagnostic file system with an operating system;

consolidating the diagnostic file into a dense diagnostic data;

transmitting the dense diagnostic data; and responsive to determining that a second unit of data in the plurality of units has not been traversed, writing the file system metadata from the second unit of data to a diagnostic file system;

wherein each unit of data in the plurality of units is traversed.

* * * * *